(12) United States Patent
Brinkmann, Jr. et al.

(10) Patent No.: US 6,675,253 B1
(45) Date of Patent: Jan. 6, 2004

(54) DYNAMIC ROUTING OF DATA ACROSS MULTIPLE DATA PATHS FROM A SOURCE CONTROLLER TO A DESTINATION CONTROLLER

(75) Inventors: Hubert E. Brinkmann, Jr., Spring, TX (US); Ryan A. Callison, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/542,309

(22) Filed: Apr. 4, 2000

(51) Int. Cl.$^7$ .................. G06F 13/00; G06F 15/173
(52) U.S. Cl. .................. 710/316; 710/38; 709/239; 709/241
(58) Field of Search .................. 710/316, 317, 710/306, 307, 38, 361, 381; 709/238, 239, 241

(56) References Cited

U.S. PATENT DOCUMENTS

| | | | |
|---|---|---|---|
| 4,490,785 A | * 12/1984 | Strecker et al. ............ 710/100 |
| 4,523,272 A | * 6/1985 | Fukunaga et al. ........... 710/107 |
| 4,783,657 A | * 11/1988 | Bouchard et al. .......... 340/825.52 |
| 5,206,943 A | 4/1993 | Callison et al. | |
| 5,241,630 A | 8/1993 | Lattin, Jr. et al. | |
| 5,406,643 A | * 4/1995 | Burke et al. ............... 709/243 |
| 5,408,644 A | 4/1995 | Schneider et al. | |
| 5,448,709 A | 9/1995 | Chandler et al. | |
| 5,465,251 A | * 11/1995 | Judd et al. ................. 370/351 |
| 5,469,548 A | 11/1995 | Callison et al. | |
| 5,511,169 A | * 4/1996 | Suda ......................... 710/100 |
| 5,586,248 A | 12/1996 | Alexander et al. | |
| 5,623,625 A | 4/1997 | Thompson et al. | |
| 5,692,200 A | 11/1997 | Carlson et al. | |

(List continued on next page.)

OTHER PUBLICATIONS

*Striping in a RAID Level 5 Disk Array*, Peter M. Chen and Edward K. Lee, pp. 1–14.
*RAID–II: Design and Implementation of a Large Scale Disk Array Controller*, R.H. Katz, P.M. Chen, A.L. Drapeau, E.K. Lee, K. Lutz, E.L. Miller, S. Seshan, D.A. Patterson, Oct. 6, 1992, pp. 1–17.
*Compaq Smart Array Controller Technology*, Compaq Computer Corporation, TechCom@compaq.com, Jun. 1998, pp. 1–18.
*Maximizing Performance in a Striped Disk Array*, Peter M. Chen and David A. Patterson.
*Declustered Disk Array Architectures with Optimal and Near–Optimal Parallelism*, Guillermo A. Alvarez, Walker A. Burkhard, Larry J. Stockmeyer and Flaviu Christian, Technical Report CS98–576, CSE, UCSD, Feb. 1998, pp. 1–25.
*Tolerating Multiple Failures in RAID Architectures with Optimal Storage and Uniform Declustering*, Guillermo A. Alvarez, Walter A. Burkhard and Flaviu Cristian, Proceedings on the 24$^{th}$ Annual ACM/IEEE International Symposium on Computer Architecture (ISCA '97).

(List continued on next page.)

*Primary Examiner*—Glenn A. Auve
*Assistant Examiner*—Trisha Vu

(57) ABSTRACT

A drive array controller or other data handling system supports dynamic data routing across multiple data paths between a source controller and a destination controller. Each data path between the source controller and the data controller can include a cache memory. Based on detection of a cache address, the data path with the cache memory corresponding to the cache address is selected. Data transfer to a single destination controller can be alternated between different data paths based on detection of different cache addresses. Each data path can include a plurality of bus/memory interface devices and a peripheral bus such as a peripheral component interconnect (PCI) bus. As an alternative to dynamic data routing based on addressing, data routing can be based on command type.

20 Claims, 5 Drawing Sheets

U.S. PATENT DOCUMENTS

| | | | |
|---|---|---|---|
| 5,717,954 A | | 2/1998 | Grieff et al. |
| 5,721,839 A | | 2/1998 | Callison et al. |
| 5,737,744 A | | 4/1998 | Callison et al. |
| 5,771,359 A | | 6/1998 | Galloway et al. |
| 5,809,280 A | | 9/1998 | Chard et al. |
| 5,809,560 A | | 9/1998 | Schneider |
| 5,832,245 A | * | 11/1998 | Gulick ................ 710/105 |
| 5,838,931 A | * | 11/1998 | Regenold et al. ........ 710/306 |
| 5,970,236 A | | 10/1999 | Galloway et al. |
| 6,088,753 A | * | 7/2000 | Sheafor et al. ............ 710/100 |
| 6,104,720 A | * | 8/2000 | Kisor ................ 370/431 |
| 6,161,165 A | * | 12/2000 | Solomon et al. ............ 710/306 |
| 6,393,519 B1 | * | 5/2002 | Fujimoto et al. ........... 711/114 |
| 6,397,356 B1 | * | 5/2002 | Yonezawa ................ 714/43 |
| 6,414,687 B1 | * | 7/2002 | Gibson ................ 345/503 |

OTHER PUBLICATIONS

*IDA–based Redundant Arrays of Inexpensive Disks*, Azer Bestavros, Proceedings of the IEEE International Conference on Parallel and Distributed Information Systems (PDIS), Dec. 1991.

*SETH: A VLSI chip for the Real–Time Information Dispersal and Retrieval for Security and Fault–Tolerance*, Azer Bestavros, 1990 International Conference on Parallel Processing, Aug. 1990, pp. 457–464.

PCI Local Bus, PCI–to–PCI Bridge Architecture Specification, Revision 1.1, Dec. 1998, © 1994, 1998, PCI Special Interest Group, pp. 1–2, 11–13, 46–47, 57–66, 69–70.

PCI Local Bus, PCI–X Addendum to the PCI Local Bus Specification, Revision 1.0, Sep. 1999, © 1999 PCI Special Interest Group, pp. 1–2, 34–37, 40–41, 93–95, 146–147.

* cited by examiner

DYNAMIC ROUTING OF DATA ACROSS MULTIPLE DATA PATHS FROM A SOURCE CONTROLLER TO A DESTINATION CONTROLLER

CROSS-REFERENCE TO RELATED APPLICATIONS

The following patent applications are incorporated herein by reference in their entirety for all purposes:

U.S. patent application, Ser. No. 09/542,624, now U.S. Pat. No. 6,370,611, entitled RAID XOR OPERATIONS TO SYNCHRONONS DRAM USING A READ BUFFER, filed concurrently by Ryan A. Callison, William C. Galloway, Christopher Garza and Albert H. Chang;

U.S. patent application, Ser. No. 09/542,760, now U.S. Pat. No. 6,370,616, entitled MEMORY INTERFACE CONTROLLER FOR DATUM RAID OPERATIONS WITH A DATUM MULTIPLIER, filed concurrently by Ryan A. Callison, Christopher Garza, Albert H. Chang, and Hubert E. Brinkmann, Jr.;

U.S. patent application, Ser. No. 09/542,420, now U.S. Pat. No. 6,581,130, entitled DYNAMIC REMAPPING OF ADDRESS REGISTERS FOR ADDRESS TRANSLATION BETWEEN MULTIPLE BUSSES, filed concurrently by Hubert E. Brinkmann, Jr. and Ryan A. Callison;

U.S. patent application, Ser. No. 09/542,969, entitled PROVIDING DATA IN RESPONSE TO A READ COMMAND THAT MAINTAINS CACHE LINE ALIGNMENT, filed concurrently by Jeff M. Carlson and Ryan A. Callison; and U.S. patent application, Ser. No. 09/542,157, entitled DISCONNECTING A DEVICE ON A CACHE LINE BOUNDARY IN RESPONSE TO A WRITE COMMAND, filed concurrently by Jeff M. Carlson and Ryan A. Callison.

BACKGROUND OF THE INVENTION

1. Field of the Invention

The present invention generally relates to storage controllers, and more particularly to dynamic routing of data across multiple data paths from a source controller to a destination controller.

2. Description of the Related Art

Storage controllers, such as a drive array controller, have traditionally provided a single data path between a source controller and a destination controller. Data transfer between the source controller and the destination controller has therefore been dependent upon the bandwidth of the single data path. Further, the provision of only a single data path between the source controller and the destination controller has restricted management of traffic between the source controller and the destination controller.

SUMMARY OF THE INVENTION

Briefly, a storage controller or other data handling system supports dynamic data routing across multiple data paths between a source device and a destination device. If a first address is detected, a first data path is selected to send data from the source device to the destination device. If a second address is detected, a second data path is selected to send data from the source device to the destination device. If the second data path was most recently selected, then the first data path can be selected. If the first data path was most recently selected, then the second data path can be selected. As an alternative to dynamic data routing based on addressing, data routing can be based on command type.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
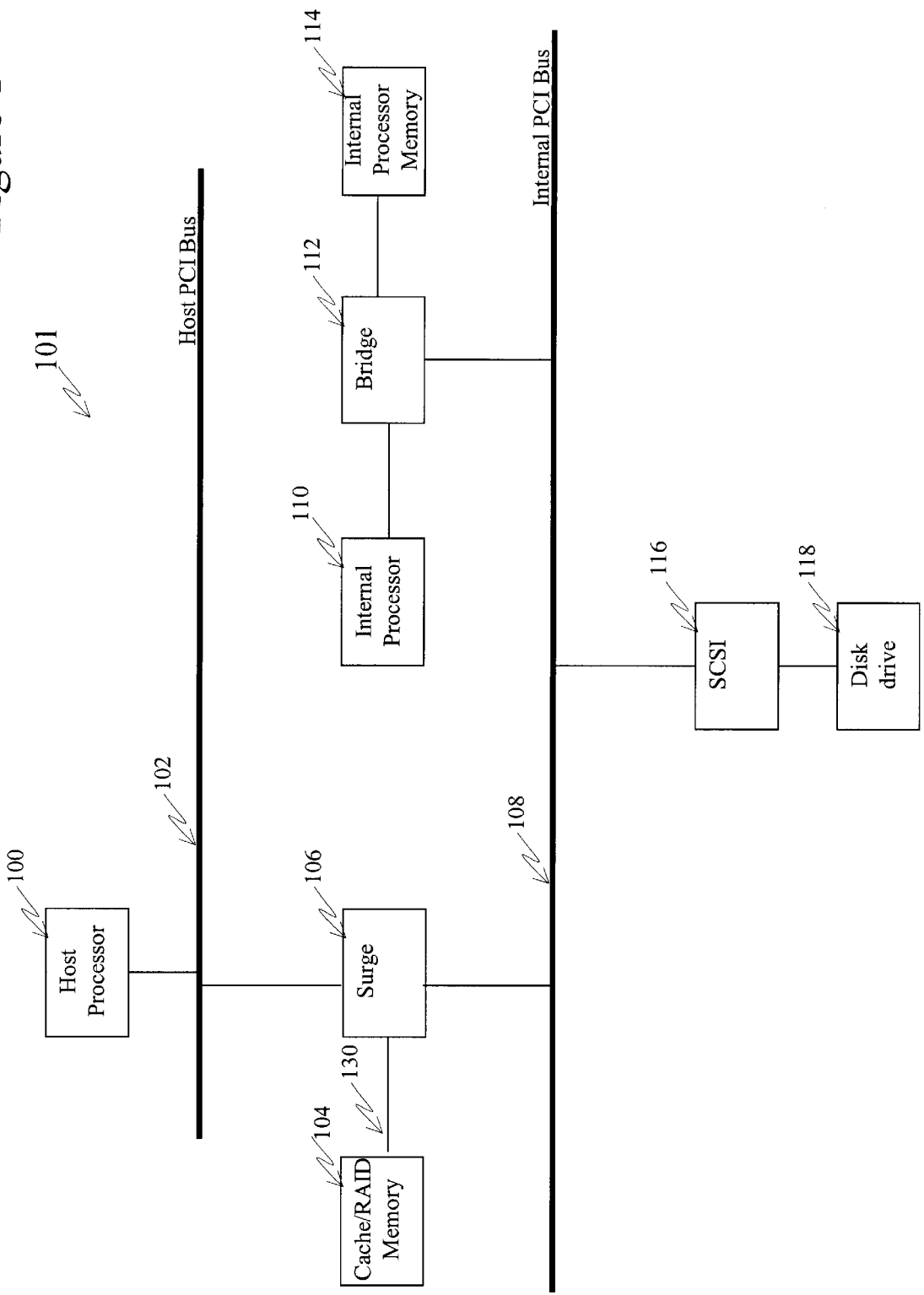
FIG. 1 is a block diagram of a computer system including a bus/memory interface device.

Referring now to FIG. 1, a block diagram of a disk subsystem 101 is shown. A Host Processor 100 is connected to a host PCI (Peripheral Component Interconnect) bus 102, which provides a communications channel to other components of a host computer system (not shown). The disk subsystem 101 also includes an internal PCI bus 108, which, like the host PCI bus 102, includes a control portion and a multiplexed address and data portion. Both buses 102 and 108 are capable of 66 MHz and 64-bit operation. For a description of the PCI bus standard, refer to PCI Specification, Revision 2.2, (December 1998), Intel Corporation of Santa Clara, Calif., which is hereby incorporated by reference as if set forth in its entirety.

Coupled to the internal PCI bus 108 is an internal or local processor 110 that controls the functions of the devices coupled to the internal PCI bus 108, for example. The Internal Processor 110 is coupled to a Internal Processor memory 114. Both the Internal Processor 110 and the Internal Processor memory 114 are coupled through a processor PCI bridge 112 to the internal PCI bus 108. The Internal Processor 110 executes firmware stored in the Internal Processor memory 114 to perform various disk controller functions.

The processor PCI bridge 112 can be implemented with an ASIC (Application Specific Integrated Circuit). Further, the processor PCI bridge 112 can include logic for converting processor memory or I/O cycles into PCI cycles, and as well can include processor-to-PCI write posting buffers. The processor-PCI bridge 112 also can include a memory controller for controlling operations to the Internal Processor memory 114. Additionally, interval timers and an interrupt controller are included in the processor-PCI bridge 112.

Also connected to the internal PCI bus 108 is at least one SCSI (Small Computer System Interface) controller 116 for interfacing with a disk drive 118. Multiple SCSI controllers and associated disk drives may be added to create a disk array subsystem.

Transactions between the host PCI bus 102 and the internal PCI bus 108 are bridged by a bus/memory interface device 106. The bus/memory interface device 106 has at least two modes of operation. In one mode, the bus/memory interface device 106 operates as a "pass-through" or PCI-to-PCI bridge device, directly passing transactions between the host PCI bus 102 and the internal PCI bus 108. The bus/memory interface device 106 also operates in a non-bridge mode, whereby transactions between the host PCI bus 102 and the internal PCI bus 108 are first translated by the bus/memory interface device 106 before being sent to their destination.

In the non-bridge mode, the bus/memory interface device 106 provides address and data translation between two or more bus interfaces, specifically between busses having non-matching address spaces. Where a conflict exists between an address in the address space for the Internal Processor 110 or the internal PCI bus 108 and an address in the address space for the Host Processor 100 or the host PCI bus 102, the bus/memory interface device 106, in the non-bridge mode, remaps the incoming transaction and translates the address originating from the originating bus into a different, but corresponding, outgoing address within the address space of the receiving or destination bus. Additionally, the bus/memory interface device 106 performs its address translations in a bi-directional manner. For example, a request issued by the Host Processor 100 passes from the host PCI bus 102 in the host PCI address space to the bus/memory interface device 106. The incoming address is then translated to the appropriate corresponding address within the address space of the internal PCI bus 108. Likewise, the Internal Processor 110 communicates with the Host Processor 100 by issuing a request in its internal PCI bus address space to the bus/memory interface device 106 where the request is translated to a corresponding address within the address space for the host PCI bus 102. Conventional PCI bridges have performed address translation.

The translation task is performed by the bus/memory interface device 106 using a system of internal programmable translation registers. The translation registers may be programmed on a per access basis by any device involved in a particular transaction. This allows all translations to occur between differing address spaces, dynamically, at a run-time level. For example, a first transaction may be initiated by a device instructing the bus/memory interface device 106 to configure its translation registers in a certain manner to allow a first translation between a first set of address spaces. The translation for that particular transaction is performed according to that configuration. A second transaction which requires translation between a second set of address spaces, different from the first set, is initiated when the requesting device instructs the bus/memory interface device 106 to reconfigure the translation registers to allow for the second transaction. In this way, a run-time change in communications among various bus interfaces is handled by dynamically reconfiguring the translation registers in the appropriate manner. Dynamic reconfiguration will be discussed below in more detail.

Here a memory storage device 104 is provided as a third interface to the bus/memory interface device 106. Here again, the bus/memory interface device 106 operates in either a bridge mode, merely passing transactions directly to the memory device 104 over the memory bus 130, or in a non-bridge or I2O mode, where requests from either the host PCI bus 102 or the internal PCI bus 108 are translated into the memory space of the memory device 104. The memory device 104 may be used either for cache memory operations and/or for RAID memory operations. While PCI I/O cycles are forwarded from the host PCI bus 102 to the internal PCI bus 108 for the bridge mode, PCI I/O cycles are not claimed by the internal PCI bus 108 in the non-bridge mode. Instead, a PCI I/O window in the bus/memory interface device 106 is opened so that the Host Processor 100 can communicate with the local processor 110.

Providing cache memory off of the bus/memory interface device 106 allows for efficient internal bus utilization through increased cache bandwidth, simultaneous host PCI bus and internal PCI bus memory operations and optimized control of bus performance. In addition, both RAID and cache operations share the same memory.

The bus/memory interface device 106 is therefore capable of operating between any number of bus interfaces. Furthermore, the bus/memory interface device 106 performs the translation function in a multi-directional manner. Therefore any request originating from any interface may be dynamically translated to the appropriate address within the address space for any other destination bus interface.

Any number of bus/memory interface devices 106 and the accompanying memory device 104 may be included in a system to create an external array architecture. The advantages of multiple bus interface devices include considerably increased cache capacity, thereby increasing memory bandwidth and increased data throughput via multiple data paths. The bus/memory interface device 106 in such a multi-device architecture provides automatic routing of data information among and between the various communication devices and memory via pre-specified address ranges.

Figure 2:
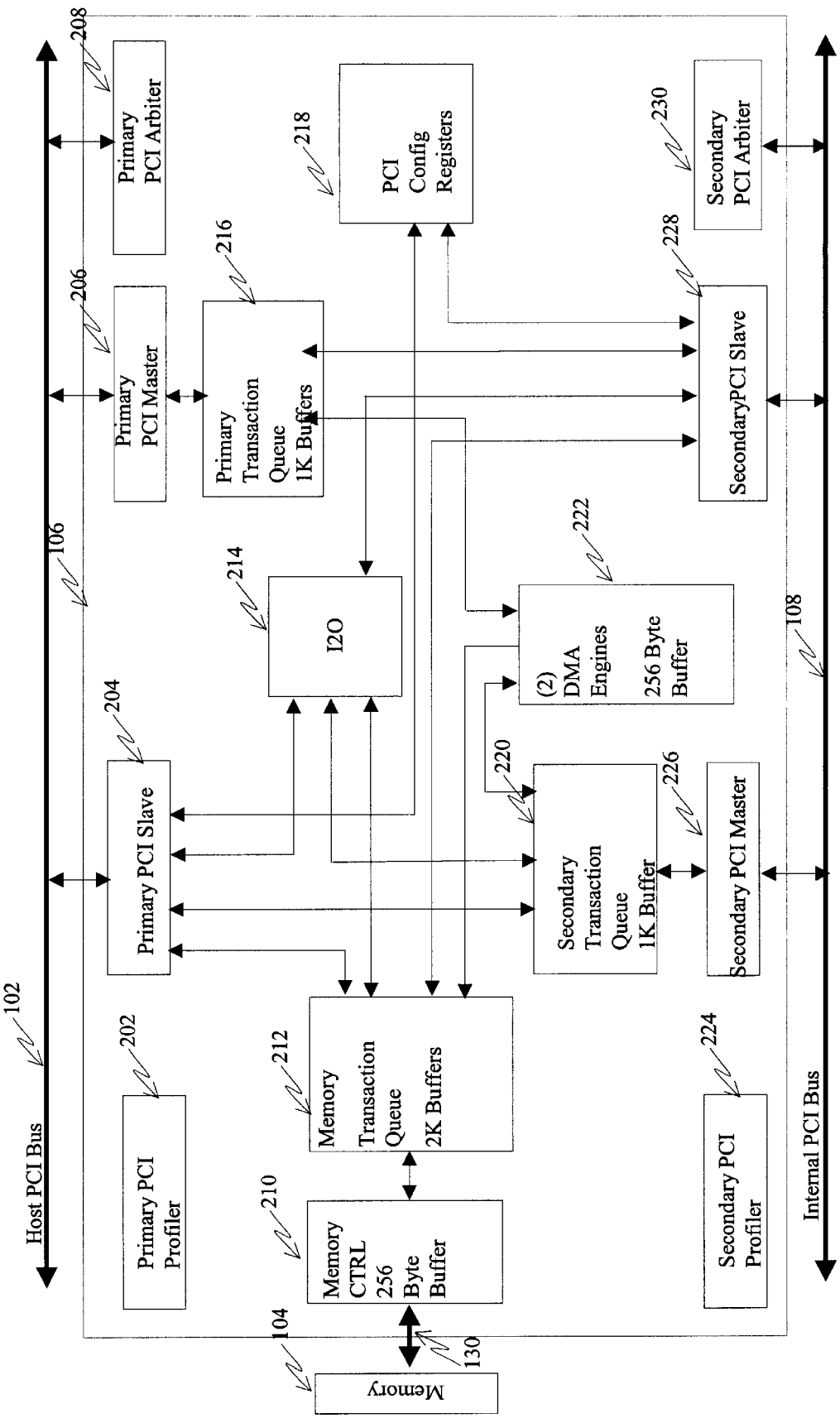
FIG. 2 is a block diagram of exemplary internal components of the bus/memory interface device of FIG. 1.

Referring now to FIG. 2, a more detailed block diagram of the bus/memory interface device 106 is shown. The bus/memory interface device 106 connects to three external interfaces: the Host PCI Bus 102, the Secondary PCI Bus 108 and the Memory Bus 130. Each of the bus interfaces 102, 108 and 130 represents a different address space for the bus/memory interface device 106. The two DMA Engines 222 and the I2O control block 214 reference each bus interface as independent memory maps. Each memory space is encoded within the data structures of the DMA Engines 222 and then specified to the I2O Control Block 214 via configuration registers within the set of PCI Configuration Registers 218.

The two DMA Engines 222 are used for the automatic transfer of data for caching operations and for high speed execution of RAID operations, for example XOR functions. Each engine is capable of moving data among the three memory spaces for the host PCI bus 102, the secondary PCI bus 108 and the memory bus 130. To carry out the task of moving data between the memory spaces, the two DMA Engines 222 interface with three Transaction Queues, each transaction queue associated with one of the three bus interfaces. Therefore, the DMA Engines 222 interface with the host PCI bus 102 via the host PCI transaction queue 216. The DMA Engines 222 interface with the internal or secondary PCI bus 108 via the secondary PCI transaction queue 220. Finally, the DMA Engines 222 interface with the Memory bus 130 via the Memory transaction queue 212.

The data structures for each of the three memory maps which are encoded within the DMA Engines 222 are also utilized by the I2O Control Block 214. The I2O Control Block 214 provides a means for the host Processor 100, the Internal Processor 110 or other input/output processor (IOP) located on the Secondary PCI bus 108 to communicate by passing inbound and outbound messages in message frames. The I2O Control Block 214 supports the industry standard interface defined in the Intelligent I/O Architecture (I2O) Specification, v 1.5, which is hereby incorporated by reference as if set forth in its entirety. Like the DMA Engines 222, the I2O Control Block 214 also interfaces with each of the three Transaction Queues 212, 216 and 220 to provide communication among and between the Host PCI Bus 102, the Secondary PCI Bus 108 and the Memory Bus 130. The I2O Control Block 214 operates in one of two modes: push and pull. In the I2O push model, the Host processor 100 writes a message frame to be communicated directly into the IOP's local memory. In the I2O pull model, the Host processor 100 writes the message frame to be communicated into host memory and allows the bus/memory interface device's 106 DMA Engines 222 to copy the message frame from host memory to the IOP memory. The I2O Control Block 214 is further connected to the Host PCI Bus 102 and the Secondary PCI bus 108 via the PCI Slaves 204 and 228, respectively.

The PCI Slaves 204 and 228 provide access gateways among the Host PCI Bus 102 and the secondary PCI Bus 108 as well as to each of the Transaction Queues 212, 216 and 220 of the other interfaces. The PCI Slaves 204 and 228 also conduct priority decoding of transactions having conflicting address ranges.

The PCI master devices 206 and 226 provide the primary PCI functions for the bus/memory interface device 106 and are effectively compliant with the 2.2 revision of the PCI Specification. PCI Masters 206 and 226 control all transfers to their respective bus. Each PCI Master communicates with its associated transaction queue to determine the timing of the data transfers. Specifically, the Host PCI Master 206 requests control of the Host PCI Bus 102 when the appropriate amount of data is available in the Host PCI Transaction Queue 216. Likewise the Secondary PCI Master 226 requests control of the Secondary PCI Bus 108 when the Secondary PCI Transaction Queue 220 contains the appropriate amount of data. Each PCI Master is likewise capable of maintaining cache-line boundaries for read operations, and each PCI slave is capable of maintaining cache-line boundaries for write operations. Maintaining cache-line boundaries for all transactions optimizes bus utilization by the bus/memory interface device 106.

As above described, the Transaction Queues 212, 216 and 220 provide the bridging mechanism between the different bus interfaces. There are three Transaction Queues, each dedicated to one of the three bus interfaces. The Host Transaction Queue 216 bridges transactions and operations to the Host PCI Master 206 onto the Host PCI Bus 102. The Secondary PCI Transaction Queue 220 bridges transactions to the Secondary PCI Master 226 onto the secondary PCI Bus 108. Finally, the Memory Transaction Queue 212 bridges memory accesses to the Memory Controller 210 and the SDRAM Memory 104. Certain of the Transaction Queues also communicate directly between the two PCI Slaves 204 and 228, the I2O control block 214 and the two DMA Engines 222.

In carrying out its function of bridging each of the bus interfaces, the Transaction Queues perform various subfunctions. First, all PCI master operations can be initiated by the associated transaction queue. The appropriate transaction queue sends a start pulse and all necessary transaction information in order to enable the PCI master to initiate a transaction. In addition, the Transaction Queues perform conflict resolutions among conflicting access requests. Each respective transaction queue determines which requesting source has access using a predetermined priority scheme. A higher priority request is given immediate access to the queue while lower priority request are held and retried for later acceptance. The Transaction Queues are also capable of determining how much data to pre-fetch for certain types of accesses from system devices which have known characteristics. Finally, the memory transaction queue 212 controls memory access requests to and from the SDRAM 104 by sending read and/or write instructions for the memory controller 210 to execute.

The PCI Profilers 202 and 224 are used to determine the amount of data that the transaction queue should pre-fetch for certain transactions on a per device basis. The transaction queue receives a selected profile for each transaction from its associated profiler.

The primary function of the Memory Controller 210 is to service memory requests from the Memory Transaction Queue 212. Specifically, the Memory Controller 210 translates instructions from the Memory Transaction Queue 212 into the proper format of read and/or write requests. The bus/memory interface device 106 supports all SDRAM architectures of varying density and speed by having registers define the number of row and column address bits and certain delay parameters.

Implemented within the bus/memory interface device 106 can be a data protection scheme for RAID (Redundant Array of Inexpensive Drives) systems which provides a specialized technique of allowing the system to experience and recover from multi-drive failures. Specifically, a multiplier is provided in connection with the Memory Transaction Queue 212 to extend the capabilities of typical RAID operations. RAID operations using a multiplier are described in detail in the commonly assigned U.S. Patent Application entitled MEMORY INTERFACE CONTROLLER FOR DATUM RAID OPERATIONS WITH A DATUM MULTIPLIER, previously incorporated herein by reference.

All transactions over the Host PCI Bus 102 and the Secondary PCI Bus 108 communicating with the bus/memory interface device 106 are prioritized according to an arbitration algorithm compliant with the PCI Specification, 2.2 revision. The arbitration algorithm is controlled in the Host PCI Arbiter 208 and the Secondary PCI Arbiter 230.

The architectures shown in FIGS. 1 and 2 and described herein are merely illustrative and not exhaustive. It should be noted that any number of different specific architectures may be employed without departing from the present invention.

The bus/memory interface device 106 can be used for internal controller or external controller applications. For the internal controller application, the bus/memory interface device 106 is used as a bridge between a host PCI bus and an internal PCI bus. With the bus/memory interface device 106, data can be routed from an internal I/O controller coupled to a disk drive to an internal PCI bus, from the internal PCI bus to a cache memory, and from the cache memory to a host PCI bus which communicates with a host. The internal I/O controller can for example be a Fibre Channel controller or a SCSI controller. While in an internal controller application the bus/memory interface device 106 provides bridging functions to a host, in an external array controller application the bus/memory interface device 106 can provide other bridging functions such as bridging to a variety of I/O controllers and even to other bus/memory interface devices 106. Alternatively, in an external tape controller application, the bus/memory interface device 106 can be used primarily for interfacing a tape controller to a cache memory in connection with error code correction. A variety of internal and external controller applications using the bus/memory interface device 106 may be employed without departing from the present invention.

Figure 3:
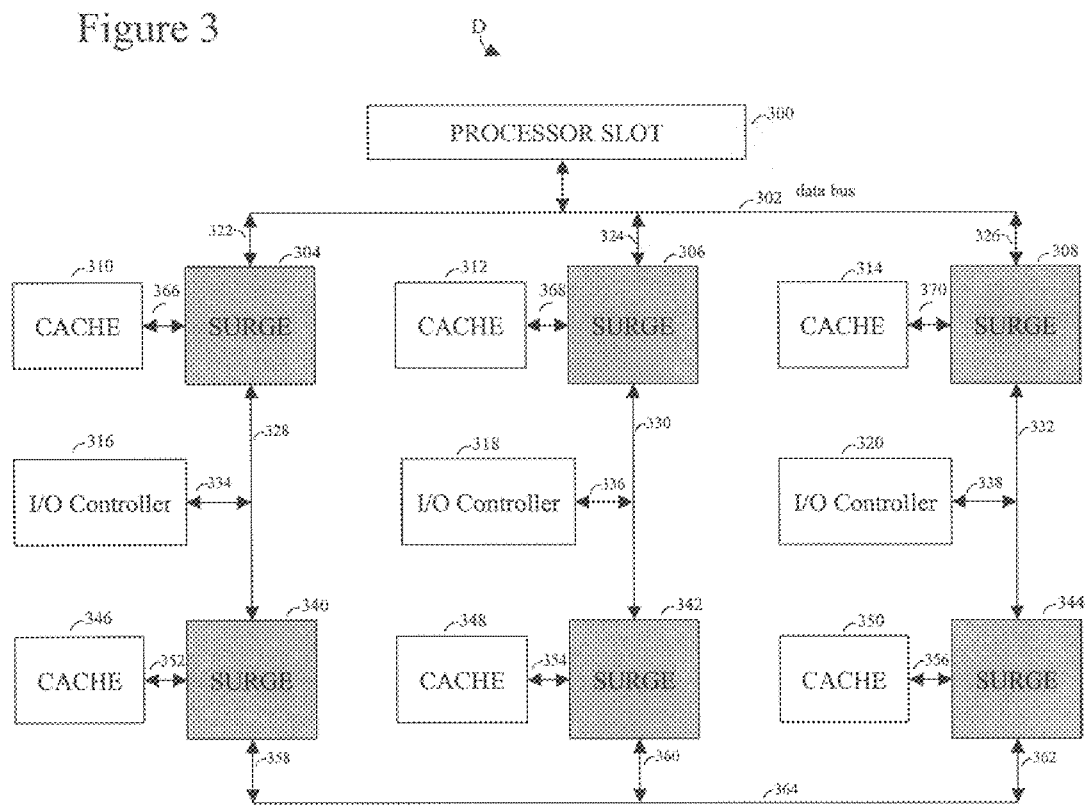
FIG. 3 is a schematic diagram of an exemplary drive array controller including multiple bus/memory interface devices.

Referring to FIG. 3, an exemplary architecture of a drive array controller D is shown. The drive array controller D supports multiple bus/memory interface devices ("Surges"), cache memories, data paths and input/output controllers. A processor slot 300 for a local processor is coupled to a data bus 302 which connects to Surges 304, 306, and 308 respectively through data busses 322, 324 and 326. The local processor can execute software for implementing the dynamic data routing techniques described below. The Surges 304, 306 and 308 are each respectively coupled to cache memories 310, 312 and 314 through data busses 366, 368 and 370. The Surges 304, 306 and 308 are further connected to data busses 328, 330 and 332 respectively. Input/output (I/O) controllers 316, 318 and 320 are respectively connected to the data busses 328, 330 and 332 through data busses 334, 336 and 338. Surges 340, 342 and 344 are respectively coupled to the data busses 328, 330 and 332. Each I/O controller 316, 318 and 320 is therefore coupled to a pair of Surges. The Surges 340, 342 and 344 are further respectively connected to cache memories 346, 348 and 350 through data busses 352, 354 and 356. Each illustrated Surge of FIG. 3 is associated with a cache memory. Data busses 358, 360 and 362 are coupled to a data bus 364 and are respectively coupled to the Surges 340, 342 and 344.

Each illustrated Surge of FIG. 3 can be of like design and operation as the Surge shown in FIG. 1 and the Surge architecture shown in FIG. 2. In a disclosed embodiment, each Surge serves as a cache memory controller for its associated cache memory and as a peripheral bus bridge for its associated data busses. Each cache memory can also serve as a RAID memory. Each data bus can be a peripheral bus such as a peripheral component interconnect (PCI) bus. For example, the data bus 302 can be a host PCI bus (upper PCI bus) and the data bus 364 can be a controller or internal PCI bus (lower PCI bus). In a disclosed embodiment, an I/O controller can be a SCSI controller or a Fibre Channel controller. Any of the I/O controllers 316, 318 and 320 can serve as a source controller or a destination controller. Alternatively, certain of the I/O controllers 316, 318 and 320 can serve exclusively as a source controller or can serve exclusively as a destination controller. In addition, any of the I/O controllers 316, 218 and 320 can be used for communication with a host processor.

For the drive array architecture of FIG. 3, at least dual data paths are provided between each of the I/O controllers 316, 318 and 320. Data can travel from the I/O controller 318 to the I/O controller 316 in at least two ways. Data can travel from the I/O controller 318 through data busses 336 and 330, through the Surge 306, into and out of the cache 312, through the Surge 306 again, across the data busses 324, 302 and 322, through the Surge 304, into and out of the cache 310, and through data busses 328 and 334 to the I/O controller 316. This routing of data constitutes one data path from the I/O controller 318 to the I/O controller 316. Alternatively, data can travel from the I/O controller 318 through the data busses 336 and 330, through the Surge 342, into and out of the cache 348, through the Surge 342 again, across the data busses 360, 364 and 358, through the Surge 340, into and out of the cache 346, through the Surge 340 again, across the data busses 328 and 334 and to the I/O controller 316. This routing of data constitutes another data path between the I/O controller 318 and the I/O controller 316. One data path to the I/O controller 316 includes the Surge 304 and the cache 310 (the closest Surge and cache upstream of the I/O controller 316), and another data path to the I/O controller 316 includes the Surge 340 and the cache 346 (the closest Surge and cache downstream of the I/O controller 316).

Data can also travel from the I/O controller 316 to the I/O controller 320 in at least two ways. Data can travel from the I/O controller 316, through the data paths 334 and 328, through the Surge 304, into and out of the cache 310, through the Surge 304 again, across the data busses 322, 302 and 326, through the Surge 308, into and out of the cache 314, through the Surge 308 again, across the data paths 332 and 338 and to the I/O controller 320. This routing of data constitutes one data path from the I/O controller 316 to the I/O controller 320. Alternatively, data can travel from the I/O controller 316, through the data paths 334 and 328, through the Surge 340, into and out of the cache 346, through the Surge 340 again, across the data paths 358, 364 and 362, through the Surge 344, into and out of the cache 350, through the Surge 344, across the data paths 332 and 338 and to the I/O controller 320. This routing of data constitutes another data path from the I/O controller 316 to the I/O controller 320. One data path to the I/O controller 320 includes the Surge 308 and the cache 314 (the closest Surge and cache upstream of the I/O controller 320), and another data path to the I/O controller 320 includes the Surge 344 and the cache 350 (the closest Surge and cache downstream of the I/O controller 320). In a disclosed embodiment, the drive array controller D is implemented as a PCI card.

In contrast to a conventional drive array controller with a single data path from a source controller to a destination controller, the disclosed drive array controller architecture provides scalable data throughput which is a function of the number of supported data paths between a source controller and a destination controller. One advantage is that traffic between I/O controllers can be better managed and load balancing of data traffic can be accomplished where there are multiple data paths to a single destination controller. For example, if data flow is delayed for one data path between the I/O controllers, then another data path between the I/O controllers can be dynamically selected. In addition, by sending some data on one data path to a destination controller and other data on another data path to the destination controller, the drive array controller D effectively doubles its bandwidth. Thus, bandwidth can be multiplied by employing these dynamic data routing techniques.

It should be understood that the exemplary drive array controller architecture shown in FIG. 3 is illustrative and not exhaustive. For example, those skilled in the art will readily appreciate that the number and arrangement of data busses, cache memories, bus/memory interface devices, and I/O controllers can be varied without departing from the spirit of the present invention. In an alternative drive array controller embodiment, each bus/memory interface device can be connected to multiple cache memories and multiple I/O controllers independent of another bus/memory interface device.

Figure 4:
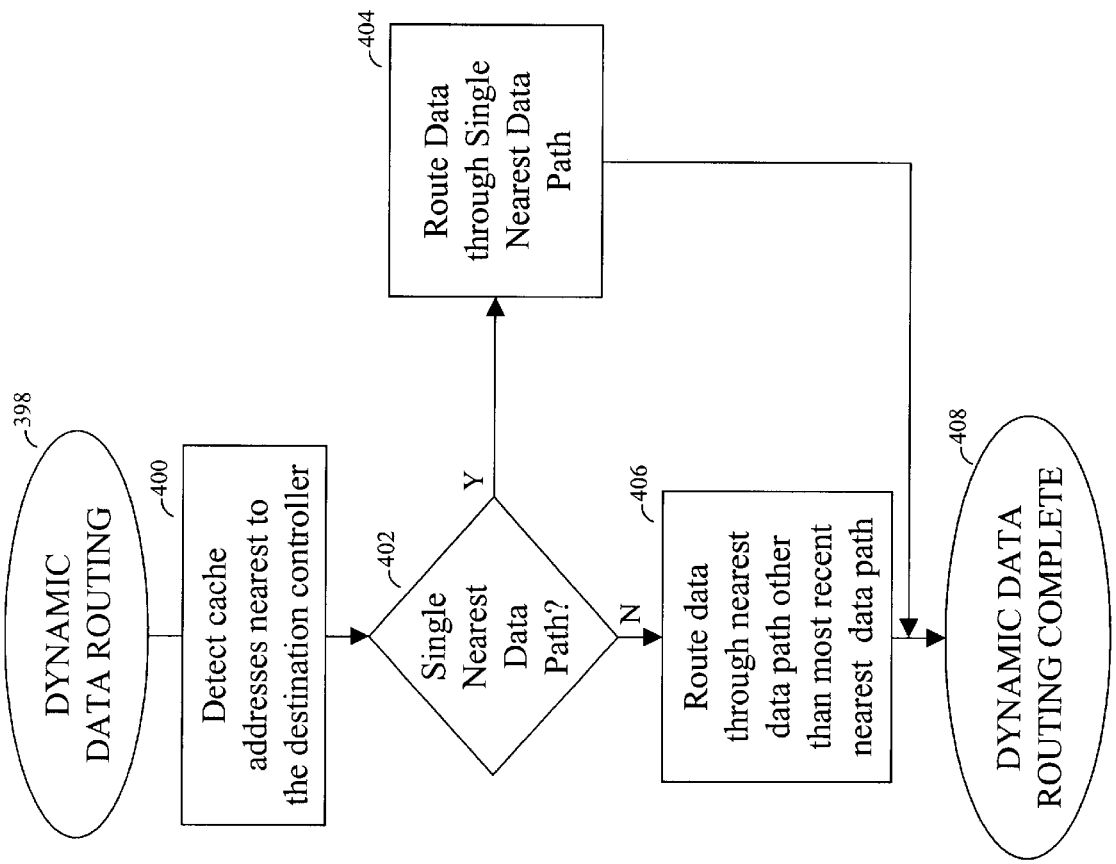
FIG. 4 is a flow chart of an exemplary dynamic data routing process based on cache addressing for the drive array controller of FIG. 3.

In a drive array controller or other storage controller architecture, data can be routed dynamically from a source controller to a destination controller. Referring to FIG. 4, an exemplary dynamic data routing process for the drive array controller D based on cache addressing is shown. Beginning in step 400, cache addresses nearest to the destination controller are detected. The process may detect one or more cache addresses as nearest to the destination controller. In step 402, it is determined if there is a single nearest data path between the source controller and the destination controller. A nearest data path refers to a data path including a cache nearest to the destination controller. More than one cache can be considered nearest to the destination controller. If only one cache address was detected in step 400, then there is a single nearest data path between the source controller and the destination controller. If multiple cache addresses were detected in step 400, then there is not a single nearest data path between the source controller and the destination controller. If there is a single nearest data path, data is routed across that data path in step 404 from the source controller to the destination controller. From step 404, control terminates in step 408 where the dynamic data routing process is complete.

If there is not a single nearest data path, the process proceeds from step 402 to step 406 where the data is routed through a nearest data path that was not most recently utilized to route data between the source controller and the destination controller. For example, if the I/O controller 318 is the source controller and the I/O controller 316 is the destination controller, then two nearest data paths exist. One nearest data path passes through the Surge 306 and the Surge 304, and the other nearest data path passes through the Surge 342 and the Surge 340. If the data path through the Surge 306 and the Surge 304 was most recently used for passing data between the I/O controller 318 and the I/O controller 316, then the data path through the Surge 342 and the Surge 340 is selected for routing data between the I/O controller 318 and the I/O controller 316. From step 406, the dynamic data routing process terminates in step 408. Thus, cache addressing of a cache near the destination controller is used to dynamically route data across a nearest data path. It should be understood that addressing of any portion of a data path can be employed to dynamically route data across a desired data path. The nature of the desired data path can be determined in a variety of ways. In this way, there is considerable flexibility in dynamically routing data to a destination controller.

Dynamic data rating routing to a destination controller based on addressing can involve selecting between multiple data busses with different address spaces. If an address in one address space is detected, then the associated data bus is used to route data to the destination controller. If an address is detected in the other address space, then that associated data bus is used to route data to the destination controller. In this case, the data routing software is configured to comprehend the parameters of both address spaces. In this way, it can be determined whether an address is in one address space or the other address space. Address translation between multiple busses with different address spaces is described in detail in a commonly-assigned U.S. Patent Application, entitled DYNAMIC REMAPPING OF ADDRESS REGISTERS FOR ADDRESS TRANSLATION BETWEEN MULTIPLE BUSSES, previously incorporated herein by reference. Some of the details related to address translation are provided above in connection with the description of FIG. 1.

Figure 5:
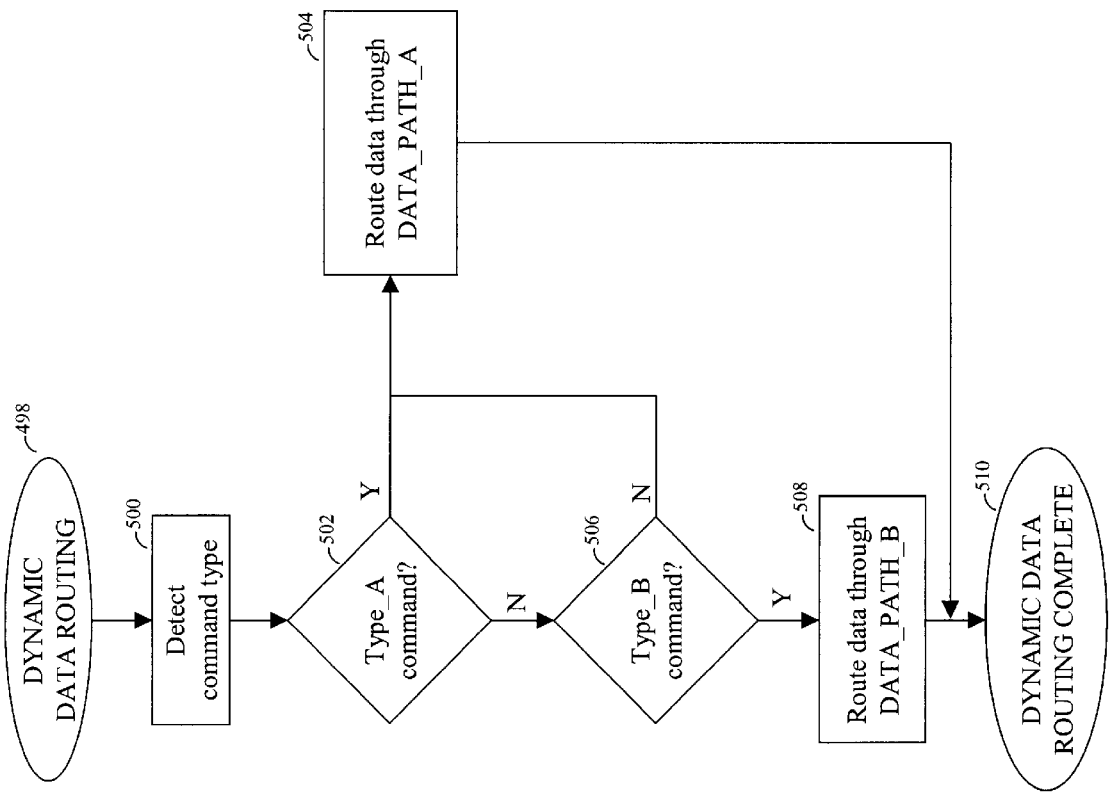
FIG. 5 is a flow chart of an exemplary dynamic data routing process based on command type for the drive array controller of FIG. 3.

Referring to FIG. 5, an exemplary dynamic data routing process for the drive array controller D based on command type is shown. Beginning in step 500, the command type of a command associated with the requested data transfer is detected. Next, in step 502, it is determined if the command is a Type_A command. If so, control proceeds to step 504 where data is routed through a data path, DATA_PATH_A, between the source controller and the destination controller. If the command is not a Type_A command, then control proceeds from step 502 to step 504 where it is determined if the command is a Type_B command. Step 506 is not needed if all commands are either Type_A commands or Type_B commands. If the command is a Type_B command, then control proceeds to step 508 where a data path, DATA_PATH_B, is selected for routing data between the source controller and the destination controller. If it is determined in step 506 that the command is not a Type_B command, then control proceeds to step 504 where data is routed through the data path, DATA_PATH_A. From steps 504 and 508, the dynamic data routing process is completed in step 510.

In accordance with this dynamic data routing process based on command type, data is selectively routed between the source controller and the destination controller. In this way, traffic between the controllers can be better managed and load balancing of data traffic can be accomplished. For example, a command type can indicate the amount of data to be transferred. If one data path currently lacks the bandwidth to handle transfer of the data, then an alternative data path to the destination controller can be selected and utilized for transfer of the data. Referring to FIG. 3, the source controller can be the I/O controller 320 and the destination controller can be the I/O controller 318. Based on its current traffic activity, the data path through the Surge 344 and the Surge 342 can lack bandwidth to handle data transfer of the data associated with the detected command. In accordance with the disclosed dynamic data routing process, when the data path through Surge 344 and the Surge 342 is unsuited for this data transfer, the data path through the Surge 308 and the Surge 306 can be selected to route data from the I/O controller 320 to the I/O controller 318. It should be understood that the dynamic data routing processes of FIGS. 4 and 5 can be implemented in software.

While testing for two types of commands is shown in FIG. 5, it should be understood that the dynamic data routing process can involve testing of more than two types of commands. While each data path related to FIG. 5 is described in connection with one type of command, it should be understood that alternatively one data path can be selected for one set of command types and another data path can be selected for another set of command types. While I/O controllers have been described as the source and destination devices in the context of FIG. 3, it should be understood that any I/O device can serve as a source device or a destination device. While a drive array controller is described in the context of FIG. 3, it should be understood that the disclosed dynamic data routing techniques are also applicable to other storage controllers, data handling systems and the like. While two data paths are described in connection with FIG. 5, it should be understood that the disclosed dynamic data routing techniques are applicable to more than two data paths. Further, it should be understood that the disclosed dynamic data routing techniques are applicable to various storage and/or computer architectures. The disclosed dynamic data routing techniques can be applied to any data handling system supporting peripheral busses such as a PCI bus. The term "data" as used in this disclosure should be understood to be synonymous with information. The term "peripheral bus" is understood to refer to any bus for connecting to a hardware device.

The foregoing disclosure and description of various embodiments are illustrative and explanatory thereof, and various changes in the architecture, controllers, busses, data paths, caches, addressing, commands, circuitry, components and order of process steps, as well as in the details of the illustrated software and hardware and construction and method of operation may be made without departing from the scope of the invention.

We claim:

1. A method of dynamic data routing for a storage controller, comprising the steps of:

selecting a first data path to send data from a source device of a storage controller to a destination device of the storage controller if only a first address is detected, wherein the first address corresponds to a first cache memory near the destination device; and selecting a second data path to send data from the source device to the destination device if only a second address is detected, wherein the second address corresponds to a second cache memory near the destination device;

wherein the first data path comprises the first cache memory and a first memory controller controlling access to the first cache memory and the second data path comprises the second cache memory and a second memory controller controlling access to the second cache memory.

2. The method of claim 1, further comprising when both the first and second addresses are detected the steps of:

selecting the first data path to send data from the source device to the destination device if the second data path was most recently selected; and selecting the second data path to send data from the source device to the destination device if the first data path was most recently selected.

3. The method of claim 1, wherein the source device and the destination device comprise input/output controllers.

4. The method of claim 1, wherein the first data path comprises a first peripheral bus bridge and the second data path comprises a second peripheral bus bridge.

5. The method of claim 4, wherein the first peripheral bus bridge comprises a first bus interface device with a peripheral bus bridge mode and the second peripheral bus bridge comprises a second bus interface device with a peripheral bus bridge mode.

6. The method of claim 1, wherein the first data path comprises a first peripheral component interconnect (PCI) bus and the second data path comprises a second PCI bus.

7. The method of claim 1, further comprising when both the first and second addresses are detected:

detecting a command type of a command associated with the data from the source device;

determining if the command type is a first command type or a second command type;

if the command type is the first command type, selecting the first data path to send the data from the source device to the destination device; and if the command type is the second command type, selecting the second data path to send the data from the source device to the destination device.

8. A storage controller comprising:

a source device;

a destination device;

a first data path between the source device and the destination device;

a second data path between the source device and the destination device;

a means for selecting the first data path to send data from the source device to the destination device if a first address is detected; and a means for selecting the second data path to send data from the source device to the destination device if a second address is detected;

wherein the first address corresponds to a first cache memory near the destination device and the second address corresponds to a second cache memory near the destination device;

wherein the first data path comprises the first cache memory and a first memory controller controlling access to the first cache memory and the second data path comprises the second cache memory and a second memory controller controlling access to the second cache memory.

9. The storage controller of claim 8, further comprising:

a means for selecting the first data path to send data from the source device to the destination device if the second data path was most recently selected; and a means for selecting the second data path to send data from the source device to the destination device if the first data path was most recently selected.

10. The storage controller of claim 8, further comprising:

a means for detecting the first address; and a means for detecting the second address.

11. The storage controller of claim 8, wherein the source device and the destination device comprise input/output controllers.

12. The storage controller of claim 8, wherein the first data path comprises a first peripheral bus bridge and the second data path comprises a second peripheral bus bridge.

13. The storage controller of claim 12, wherein the first peripheral bus bridge comprises a first bus interface device with a peripheral bus bridge mode and the second peripheral bus bridge comprises a second bus interface device with a peripheral bus bridge mode.

14. The storage controller of claim 8, wherein the first data path comprises a first peripheral component interconnect (PCI) bus and the second data path comprises a second PCI bus.

15. The storage controller of claim 14, wherein the first PCI bus is associated with a first address space and the second PCI bus is associated with a second address space.

16. A data handling system adapted for dynamic data routing, the system comprising:

a first data bus;

a second data bus;

a source device;

a destination device;

a processor, and software executed by the processor to dynamically select the first data bus to route data from the source device to the destination device if a first address is detected and to dynamically select the second data bus to route data from the source device to the destination device if a second address is detected;

wherein the first data bus comprises a first memory controller controlling access to a first memory device and the second data bus comprises a second memory controller controlling access to a second memory device, the first and second memory devices being in the first and second data busses, respectively.

17. The system of claim 16, wherein the first address is in a first address space associated with the first data bus and the second address is in a second address space associated with the second data bus.

18. The system of claim 16, wherein the first data bus and the second data bus comprise peripheral component interconnect (PCI) busses.

19. A method of operating a drive array controller to provide dynamic data routing based on cache addressing, comprising:

detecting cache addresses nearest to a destination controller relative to a source controller;

when the detecting results in a single one of the detected cache addresses, identifying a single nearest data path between the source controller and the destination controller;

if the single nearest data path is identified, routing data from the source controller to the destination controller on the single nearest data path;

when the detecting results in at least two of the detected cache addresses, identifying a nearest data path between the source controller and the destination controller that is not most recently utilized to route data between the source controller and the destination controller; and if the not most recently utilized nearest data path is identified, routing the data from the source controller to the destination controller.

20. The method of claim 19, wherein each of the nearest data paths include a cache memory and a memory controller controlling access to the cache memory.

* * * * *